(12) United States Patent
Ueno et al.

(10) Patent No.: US 9,981,535 B2
(45) Date of Patent: May 29, 2018

(54) VEHICLE BACK DOOR STRUCTURE

(71) Applicant: TOYOTA JIDOSHA KABUSHIKI KAISHA, Toyota-shi (JP)

(72) Inventors: Koichiro Ueno, Nagoya (JP); Hiroshi Kanda, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days. days.

(21) Appl. No.: 15/233,635

(22) Filed: Aug. 10, 2016

(65) Prior Publication Data
US 2017/0066306 A1    Mar. 9, 2017

(30) Foreign Application Priority Data

Sep. 4, 2015  (JP) ................................. 2015-175151

(51) Int. Cl.
*B60J 5/10*        (2006.01)
(52) U.S. Cl.
CPC .............. *B60J 5/107* (2013.01); *B60J 5/101* (2013.01)
(58) Field of Classification Search
CPC ....... B60J 1/18; B60J 5/10; B60J 5/107; B60J 5/101; B60J 5/0481
See application file for complete search history.

(56) References Cited

U.S. PATENT DOCUMENTS

| | | | | |
|---|---|---|---|---|
| 4,822,098 A | * | 4/1989 | Vogt ......................... | B60J 5/101 296/146.5 |
| 8,899,658 B1 | * | 12/2014 | Gangal .................... | B60J 5/107 296/146.6 |
| 8,979,170 B2 | * | 3/2015 | Kurita .................... | B62D 25/02 296/146.8 |
| 9,469,180 B2 | * | 10/2016 | Kamimura ............... | B60J 5/107 |
| 9,688,125 B2 | * | 6/2017 | Ayukawa ................. | B60J 5/107 |
| 2007/0145773 A1 | * | 6/2007 | Saitoh ..................... | B60J 5/101 296/146.8 |
| 2008/0030047 A1 | * | 2/2008 | Munenaga ............... | B60J 5/101 296/146.6 |
| 2011/0074179 A1 | * | 3/2011 | Kuntze .................... | B60J 5/107 296/146.6 |
| 2011/0179719 A1 | * | 7/2011 | Matsumoto ................ | B60J 5/10 49/502 |

(Continued)

FOREIGN PATENT DOCUMENTS

| JP | 2007-216870 | 8/2007 |
|---|---|---|
| JP | 2010-173348 | 8/2010 |

(Continued)

*Primary Examiner* — Justin B Rephann
(74) *Attorney, Agent, or Firm* — Oblon, McClelland, Maier & Neustadt, L.L.P.

(57) ABSTRACT

Upright bead sections extending in a door vertical direction and having recessed shapes indented toward a vehicle cabin inside are formed at the two vehicle width direction end portions of a resin door inner panel. Side reinforcement portions of metal hinge reinforcements are disposed inside the recessed shapes of the upright bead sections, and extend in the door vertical direction. The side reinforcement portions include bent plate portions having bent plate shapes running along locations of the upright bead sections from the outside sidewall portions to recessed bottom wall portions. The side reinforcement portions are each joined to the respective outside sidewall portion through an adhesive layer, and are each joined to the respective recessed bottom wall portion through an adhesive layer.

4 Claims, 6 Drawing Sheets

(56) References Cited

U.S. PATENT DOCUMENTS

| | | | | |
|---|---|---|---|---|
| 2011/0241376 | A1* | 10/2011 | Igura | B60J 5/101 296/146.3 |
| 2012/0002434 | A1* | 1/2012 | Rajon | B60J 5/107 362/544 |
| 2012/0248814 | A1* | 10/2012 | Tsukiyama | B60J 5/101 296/146.8 |
| 2014/0167446 | A1* | 6/2014 | Iwano | B60J 5/107 296/146.8 |
| 2014/0210230 | A1* | 7/2014 | Iwano | B60J 5/0429 296/146.6 |
| 2016/0075216 | A1* | 3/2016 | Kamimura | B60J 5/101 296/146.2 |
| 2016/0114663 | A1* | 4/2016 | Kawashima | B60J 5/107 49/501 |
| 2016/0152121 | A1* | 6/2016 | Ikeda | B60J 5/107 49/501 |
| 2016/0167492 | A1* | 6/2016 | Ikeda | B60J 5/10 296/146.2 |
| 2016/0167493 | A1* | 6/2016 | Adachi | B60J 5/107 49/502 |
| 2016/0167494 | A1* | 6/2016 | Ayukawa | B60J 5/107 49/502 |
| 2016/0167495 | A1* | 6/2016 | Kamimura | B60J 5/107 52/309.1 |
| 2016/0236723 | A1* | 8/2016 | Ikeda | B60J 5/0461 |
| 2016/0375747 | A1* | 12/2016 | Kawashima | B60J 5/101 49/475.1 |
| 2017/0174058 | A1* | 6/2017 | Miyake | B60J 5/107 |

FOREIGN PATENT DOCUMENTS

| | | |
|---|---|---|
| JP | 2011-126388 | 6/2011 |
| JP | 2013-129265 | 7/2013 |
| JP | 5708428 | 4/2015 |

* cited by examiner ic # VEHICLE BACK DOOR STRUCTURE

CROSS-REFERENCE TO RELATED APPLICATION

This application claims priority under 35 USC 119 from Japanese Patent application, No. 2015-175151 filed on Sep. 4, 2015, the disclosure of which is incorporated by reference herein.

BACKGROUND

Technical Field

The present disclosure relates to a vehicle back door structure applied to a back door of a vehicle rear section.

Related Art

Structures for a back door are known in which a door upper end portion is attached to a vehicle body upper section by a door hinge, and, in a state in which a door lower end portion is locked, vertical direction intermediate portions of each of the two side portions of the door is biased toward a vehicle cabin outside by a damper (see, for example, Japanese Patent No. 5708428). Sometimes, in order to reduce weight, for example, a resin panel is employed in the back door (see, for example, Japanese Patent No. 5708428, Japanese Patent Application Laid-Open (JP-A) Nos. 2010-173348 and 2013-129265).

Here, the resin panel is more liable to deform than, for example, a metal panel, and so sometimes, from the viewpoint of securing a rigid fit, a bead portion is formed to both side portions of a resin door inner panel, and reinforcements for reinforcing the panel are fastened by bolts onto both side portions of the resin door inner panel (see, for example, paragraphs [0026], [0028], and FIG. 2 of Japanese Patent No. 5708428, and paragraphs [0002] to [0004] and FIG. 5 to FIG. 8 of JP-A No. 2010-173348. To briefly explain such structures, the bead portions on both side portions of the door inner panel extend in the door vertical direction and are formed with recessed shapes indented toward a vehicle cabin inside, and the reinforcements are disposed inside recessed portions of the bead portions and are fastened to the side portions of the door inner panel using bolts.

However, as illustrated in FIG. 6 to FIG. 8 of JP-A No. 2010-173348, for example, due to design considerations, locations of the door inner panel where the reinforcements are fastened using bolts are limited to locations that cannot be seen from the vehicle cabin in a door closed state, and locations that can be seen in a door closed state are avoided. Namely, the reinforcements are not fastened using bolts at locations of the door inner panel that are exposed to the vehicle cabin inside (including end portions at the vehicle cabin inside of the bead portion) at locations further to the vehicle width direction inside than a weather strip in the door opening in a door closed state. Thus, according to such technology, it is difficult to ensure a rigid fit of a back door while suppressing an increase in mass.

SUMMARY

The present disclosure obtains a vehicle back door structure capable of securing a rigid fit of a back door while suppressing an increase in mass.

A first aspect of the present disclosure is a vehicle back door structure including a back door, a resin door inner panel, and a pair of left and right reinforcements. The back door opens and closes a back door opening at a vehicle rear section, has an upper end portion attached to a vehicle body upper section by a door hinge, has a vehicle width direction intermediate portion of a lower end portion latched to a vehicle body lower section by a door lock mechanism, and has two vehicle width direction end portions of an vertical direction intermediate portion, the two vehicle width direction end portions being biased toward a vehicle cabin outside by dampers in a closed state. The resin door inner panel configures a door inner panel of the back door, and is formed with a pair of left and right upright bead sections having recessed shapes indented toward a vehicle cabin inside and extending along a door vertical direction at two respective vehicle width direction end portions of the door inner panel. Each of the upright bead sections is configured including an outside sidewall portion that configures a vehicle width direction outside end portion of the upright bead section and that is disposed running along a door thickness direction, and a recessed bottom wall portion that configures a vehicle cabin inside end portion of the upright bead section and that is disposed running along the vehicle width direction. Each of the left and right reinforcements is configured including a side reinforcement portion disposed inside the recessed shape of the respective upright bead section and extending in the door vertical direction, with each of the side reinforcement portions including a bent plate portion having a bent plate shape running along locations of the respective upright bead section from the outside sidewall portion to the recessed bottom wall portion. The side reinforcement portions are joined to the outside sidewall portion and the recessed bottom wall portion through respective adhesive layers.

According to the first aspect, the upright bead sections having recessed shapes indented toward the vehicle cabin inside and extending along the door vertical direction are formed at the two respective vehicle width direction end portions of the resin door inner panel. Thus, in a door closed state, the rigidity of the two vehicle width direction end portions of the door inner panel against biasing force from the dampers raised by the upright bead sections. Moreover, the side reinforcement portions are disposed inside the recessed shapes of the respective upright bead sections and extend in the door vertical direction, such that the upright bead sections are reinforced by the reinforcements.

The side reinforcement portions include the bent plate portions having bent plate shapes running along locations of the respective upright bead section from the outside sidewall portion to the recessed bottom wall portion, and the side reinforcement portions are joined to the outside sidewall portion and to the recessed bottom wall portion through respective adhesive layers. Thus, in such a structure, in cases in which locations of the respective upright bead sections from the outside side wall portions to the recessed bottom wall portions attempt to deform due to load input, deformation of the locations from the outside side wall portions to the recessed bottom wall portions can be suppressed along the entirety of the bent plate portion of the side reinforcement portion. Accordingly, in cases in which, in a door closed state, biasing force from the dampers is borne by the door inner panel, the rigidity of the side reinforcement portions can be effectively utilized against the load. Moreover, in such a structure, the joining structure between the upright bead sections and the side reinforcement portions is not visible from the vehicle cabin, and an increase in mass can also be suppressed.

A second aspect of the present disclosure is the configuration of the first aspect, wherein lower configuration portions formed to the upright bead sections at a lower portion side of the door inner panel are each configured including a first intermediate wall portion and a second intermediate wall portion. The first intermediate wall portion extends from a vehicle cabin inside terminal end of the outside sidewall portion toward the vehicle width direction inside and, in a door closed state, abuts a weather strip installed to the back door opening. The second intermediate wall portion links a vehicle width direction inside terminal end of the first intermediate wall portion together with a vehicle width direction outside terminal end of the recessed bottom wall portion, and is disposed running along the door thickness direction. At locations disposed inside the recessed shapes of the lower configuration portions, the side reinforcement portions are joined through respective adhesive layers to a vehicle cabin outside location of the outside sidewall portion and a vehicle width direction inside locations of the recessed bottom wall portion, and the side reinforcement portions are set with a gap to a vehicle cabin inside location of the outside sidewall portion, a gap to the first intermediate wall portion, a gap to the second intermediate wall portion, and a gap to a vehicle width direction outside location of the recessed bottom wall portion.

According to the second aspect, in the lower configuration portions of the upright bead sections, the first intermediate wall portion extends from the vehicle cabin inside terminal end of the outside sidewall portion toward the vehicle width direction inside and, in the door closed state, abuts the weather strip installed to the back door opening. Moreover, in the lower configuration portion of the upright bead section, the second intermediate wall portion links the vehicle width direction inside terminal end of the first intermediate wall portion together with the vehicle width direction outside terminal end of the recessed bottom wall portion, and is disposed running along the door thickness direction. The upright bead sections are shaped so as to be further indented toward the vehicle cabin inside from the first intermediate wall portion abutting the weather strip. In consideration thereof, the side reinforcement portions include the bent plate portions having a bent plate shape running along the locations of the upright bead sections from the outside sidewall portions to the recessed bottom wall portions, and the side reinforcement portions are joined through respective adhesive layers to the outside sidewall portions and the recessed bottom wall portions. Accordingly, even though the depth of the upright bead section is deep in the door thickness direction, deformation of the locations from the outside sidewall portions to the recessed bottom wall portions can be effectively suppressed by the side reinforcement portions.

Moreover, at locations disposed inside the recessed shapes of the lower configuration portions of the upright bead sections, the side reinforcement portions are joined through respective adhesive layers at the vehicle cabin outside location of the outside sidewall portion and at the vehicle width direction inside location of the recessed bottom wall portion, and the side reinforcement portions are set with a gap to the vehicle cabin inside location of the outside sidewall portion, a gap to the first intermediate wall portion, a gap to the second intermediate wall portion, and a gap to the vehicle width direction outside location of the recessed bottom wall portion. Thus, an increase in mass can be even further suppressed, and, even were errors to occur in manufacturing the upright bead sections and the side reinforcement portions, such manufacturing errors would be absorbed by the gaps.

A third aspect of the present disclosure is the configuration of the first aspect or the second aspect, wherein attachment portions of the dampers are installed to the outside sidewall portions of the upright bead sections, and to outside sidewall reinforcement portions disposed running along the outside sidewall portions at the bent plate portions of the side reinforcement portions, and, at the door vertical direction positions corresponding to the attachment portions of the dampers, the outside sidewall reinforcement portions are joined to the outside sidewall portions through respective adhesive layers at the vehicle cabin outside location and at the vehicle cabin inside of the damper attachment portions.

According to the third aspect, the attachment portions of the dampers are installed to the outside sidewall portions of the upright bead sections, and to outside sidewall reinforcement portions disposed running along the outside sidewall portions at the bent plate portions of the side reinforcement portions. Accordingly, load from the damper side acts directly on the outside sidewall portions of the upright bead sections and on the outside sidewall reinforcement portions of the side reinforcement portions. At the door vertical direction positions corresponding to those of the damper attachment portions, the outside sidewall reinforcement portions are joined to the outside sidewall portions through respective adhesive layers at the vehicle cabin outside location and at the vehicle cabin inside of the damper attachment portions. Thus, even if force from the damper side acts directly on the outside sidewall portions of the upright bead sections and on the outside sidewall reinforcement portions of the side reinforcement portion substantially along the door thickness direction, relative displacement between the outside sidewall portions of the upright bead sections and the outside sidewall reinforcement portions of the side reinforcement portions can be effectively suppressed by the adhesive layers.

As explained above, the vehicle back door structure of the present disclosure enables a rigid fit of a back door to be secured, while suppressing an increase in mass.

BRIEF DESCRIPTION OF THE DRAWINGS

Exemplary embodiment of the present disclosure will be described in detail based on the following figures, wherein.

DETAILED DESCRIPTION

Configuration of Exemplary Embodiment

Explanation follows regarding a vehicle back door structure according to an exemplary embodiment of the present disclosure, with reference to FIG. 1 to FIG. 6. Note that in each of the drawings, the arrow FR indicates the vehicle front side, the arrow UP indicates the vehicle upper side, and the arrow W indicates the vehicle width direction, as appropriate. A door width direction (door left-right direction) of a back door 30 is in the same direction as the vehicle width direction.

Figure 1:
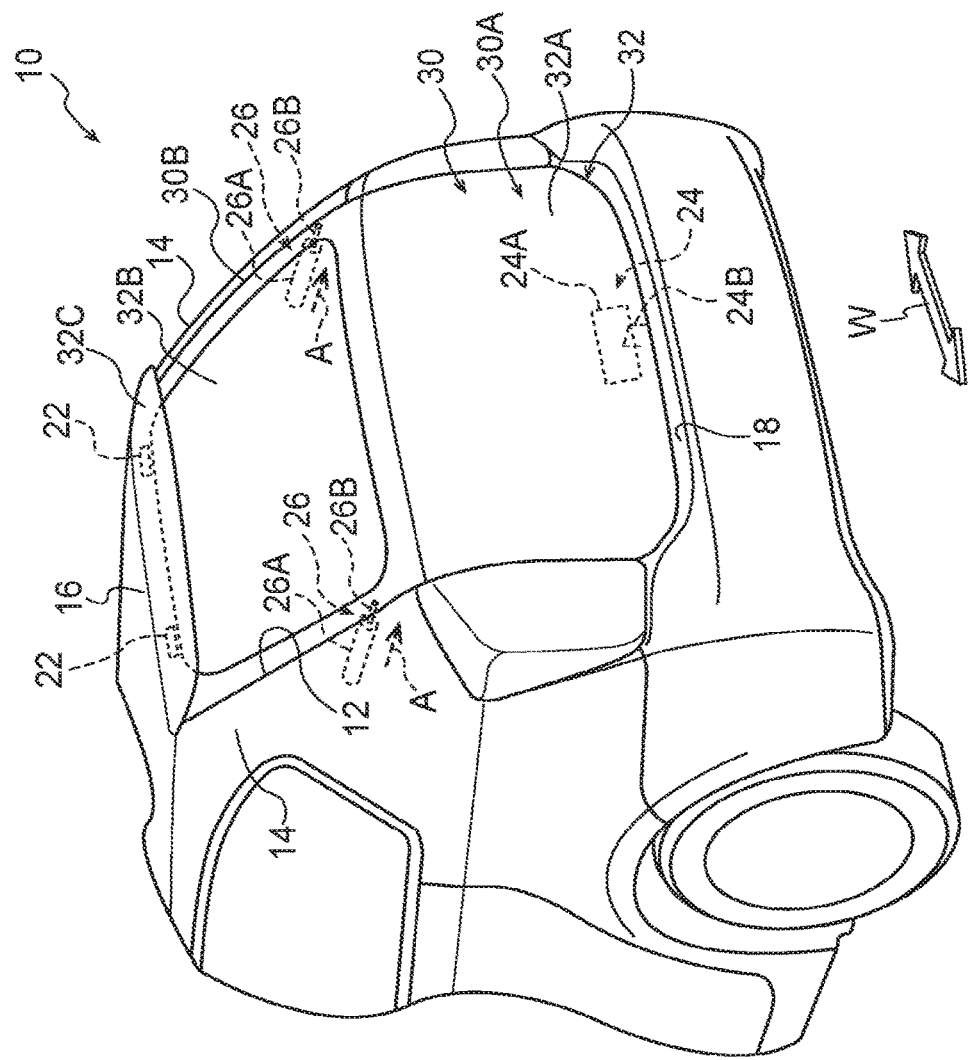
FIG. 1 is a perspective view illustrating a vehicle rear section including a back door applied with a vehicle back door structure according to an exemplary embodiment of the present disclosure.

FIG. 1 illustrates a vehicle rear section 10 of an automobile in perspective view. As illustrated in FIG. 1, the vehicle rear section 10 is formed with a back door opening 12 that opens toward the rear in a vehicle front-rear direction, and the back door 30 (a relevant portion broadly understood as an "opening and closing body") is provided for opening and closing the back door opening 12. Rear pillars 14 are provided so as to be disposed up-down at both respective sides of the back door opening 12. A rear roof header section 16 is disposed at an upper edge side of the back door opening 12 running substantially along the vehicle width direction, and a lower back section 18 is disposed at a lower edge side of the back door opening 12 running substantially along the vehicle width direction. Moreover, a weather strip 20 (see FIG. 3 and FIG. 4) is installed to the back door opening 12.

The back door 30 includes a back door main body portion 30A at a lower portion of the door, and further includes a back door frame portion 30B at an upper portion of the door. A back door window glass 32B (also referred to below as "rear glass"), described later, is installed to the back door frame portion 30B. An upper end portion of the back door 30 is a base end portion at an attachment side to the vehicle body, and both the left and right sides of the upper end portion are attached to the rear roof header section 16 of a vehicle body upper section by door hinges 22. Each door hinge 22 coupling together the back door 30 and the rear roof header section 16 includes a hinge shaft (not illustrated in the drawings) with an axial direction in the vehicle width direction. The back door opening 12 can be opened and closed by rotationally moving the back door 30 about the hinge shafts of the door hinges 22. Namely, the back door 30 is able to move between a closed position (the state in FIG. 1) in which the back door opening 12 is closed off, and an open position (not illustrated in the drawings) in which the back door opening 12 is open.

A vehicle width direction intermediate portion of a lower end portion of the back door 30 is configured so as to be latched to a vehicle body lower section using a door lock mechanism 24. The door lock mechanism 24 includes a lock mechanism 24A attached to a back door 30 side, and a striker 24B attached to a lower back section 18 side. The lock mechanism 24A is able to latch to the striker 24B, such that the back door 30 is retained in the closed state by the lock mechanism 24A being latched to the striker 24B.

Dampers 26 are attached to the two vehicle width direction end portions of the back door 30, at vertical intermediate portions thereof. Each of the pair of dampers 26 is attached through an attachment member to a side portion of the back door opening 12, at respective vertical direction intermediate portion sides thereof. Each of the pair of dampers 26 is respectively configured including a cylinder 26A that is disposed so as to be capable of rotationally moving about an axis along the vehicle width direction, and a piston 26B that is partially disposed inside the cylinder 26A and that is capable of moving back and forth so as to change the amount by which the piston 26B projects out from a leading end side of the cylinder 26A. Joint portions 26C (see FIG. 4) are provided to leading end portions of the pistons 26B, and stay attachment bolts 26D (see FIG. 4) attached to the joint portions 26C are attached on the side of the two side lower portions of the back door frame portions 30B. In the closed state of the back door 30, the dampers 26 bias the two vehicle width direction end portions of the back door 30 at the vertical direction intermediate portions thereof toward a vehicle cabin outside (a direction including a component toward the vehicle read side; an arrow A direction in the present exemplary embodiment). The dampers 26 extend while rotating according to the degree to which the back door 30 is open. Due to the dampers 26 extending, the force for the opening operation of the back door 30 is reduced, and the back door 30 is retained in an open state.

Figure 2:
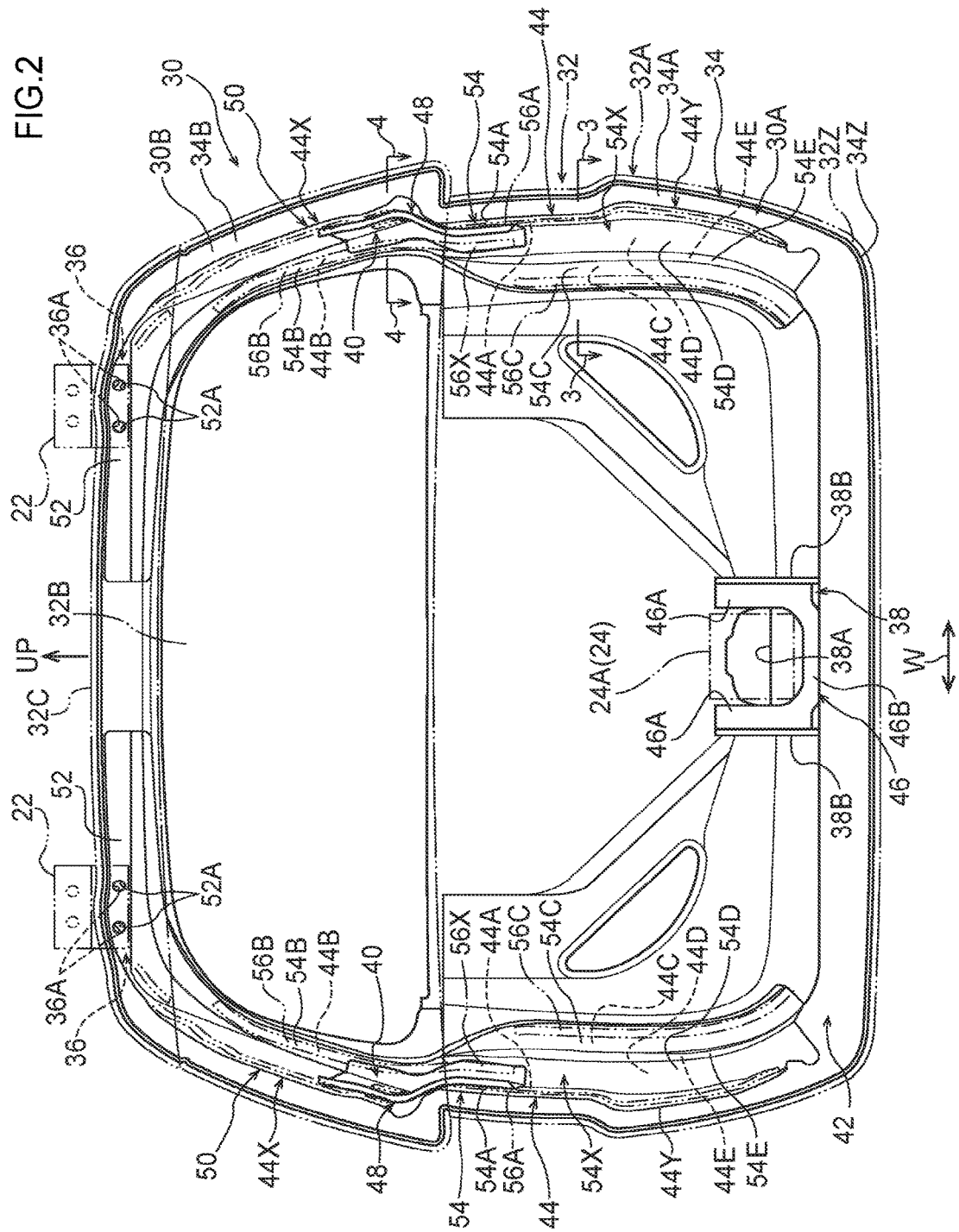
FIG. 2 is a face-on view illustrating the back door in FIG. 1 in a state as viewed from a vehicle rear side with an outer unit illustrated in a see-through state.

FIG. 2 is a face-on view illustrating the back door 30 in a state as viewed from the vehicle rear side, with an outer unit 32 indicated by double-dotted dashed lines rendered in a see-through state. The back door 30 is configured including the outer unit 32 disposed at the vehicle cabin outside (at the outside of the door), and a door inner panel 34 disposed at the vehicle cabin inside (at the inside of the door). Note that door trim 35 (see FIG. 3) is attached to a predetermined range of a lower portion of the door inner panel 34 at the vehicle cabin inside (the door inside).

As illustrated in FIG. 1, the outer unit 32 is configured including a resin door outer panel 32A disposed at the lower portion of the back door 30, a back door window glass 32B disposed at the upper portion of the back door 30, and a resin rear spoiler 32C disposed at an upper end portion of the back door 30. The door outer panel 32A configures an outer panel of the back door main body portion 30A of the back door 30. The back door window glass 32B is joined to an upper end portion of the resin door outer panel 32A through an adhesive layer, and the rear spoiler 32C is joined to an upper end portion of the back door window glass 32B through an adhesive layer.

By contrast, the door inner panel 34 illustrated in FIG. 2 is made of resin and configures a door inner panel of the back door 30. The door inner panel 34 includes a door inner panel main body portion 34A that configures an inner panel of the back door main body portion 30A, and a door inner panel frame portion 34B that configures the back door frame portion 30B (see FIG. 1). The door inner panel 34 and the outer unit 32 are disposed facing each other, and an outer peripheral edge portion 34Z of the door inner panel 34 and an outer peripheral edge portion 32Z of the outer unit 32 are joined together through an adhesive layer 33 (see FIG. 3 and FIG. 4).

An annular bead 42 is formed to the door inner panel 34 so as to run around the outer periphery of the door inner panel 34. The annular bead 42 is formed in a recessed shape indented toward the vehicle cabin inside. Parts of the annular bead 42 at the two vehicle width direction end portions of the door inner panel 34 extend in the door vertical direction and are configured by upright bead sections 44 formed in recessed shapes indented toward the vehicle cabin inside. Detailed explanation regarding the upright bead sections 44 is described later.

Upper end portions of the door inner panel 34 (the door inner panel frame portion 34B) are configured by a pair of left and right door hinge attachment portions 36 at locations shifted toward the two respective vehicle width direction end portions, and the door hinges 22 described above are attached thereto. Bolt insertion holes 36A are formed in each door hinge attachment portion 36, and upper end portions of hinge reinforcements 50 (described in detail later), serving as reinforcement, are superimposed on the vehicle rear side of the door hinge attachment portions 36.

By contrast, the vehicle width direction intermediate portion of the lower end portion of the door inner panel 34 (the door inner panel main body portion 34A) is configured by a lock mechanism attachment portion 38 to which the lock mechanism 24A described above is attached. A wiring layout hole 38A is formed penetrating through the lock mechanism attachment portion 38, and a pair of left and right sidewall portions 38B for attaching lock reinforcement 46 are formed in the lock mechanism attachment portion 38.

The lock reinforcement 46 is made of metal (for example, made of steel), and is a high strength, high rigidity reinforcement member bent in substantially a U shape, as viewed face-on, and includes a pair of left and right upright wall portions 46A and a lower wall portion 46B. The lock reinforcement 46 is disposed between the pair of sidewall portions 38B, and the upright wall portions 46A are fixed to the sidewall portions 38B by bolt fasteners or the like, such that the lock reinforcement 46 is fixed to the lower end portion of the door inner panel 34 and reinforces the lock mechanism attachment portion 38 of the door inner panel 34.

The pair of left and right hinge reinforcements 50 are made of metal (for example, made of steel), and are each a high strength, high rigidity reinforcement member bent in substantially an L shape as viewed face-on. The hinge reinforcements 50 are respectively fixed to locations along the annular bead 42 spanning from left and right upper end portions to lower portions at the vehicle width direction outside end portions of the outer periphery of the door inner panel 34. Namely, the hinge reinforcements 50 include upper end reinforcement portions 52 that reinforce the respective door hinge attachment portions 36 at the left and right upper end portions of the door inner panel 34, and side reinforcement portions 54 that respectively extend from vehicle width direction outside end portions of the upper end reinforcement portions 52 to the door lower side, that are respectively provided at the two end portion sides at the left and right of the back door 30, and that reinforce the two left and right end portions of the door inner panel 34.

Bolt insertion holes 52A are formed in the upper end portion of each hinge reinforcement 50, at locations corresponding to the bolt insertion holes 36A of the door hinge attachment portions 36. Each door hinge 22 is fastened to the door inner panel 34 and the respective hinge reinforcement 50 by bolts or the like (not illustrated in the drawings) that have been inserted through the bolt insertion holes 36A, 52A.

Figure 4:
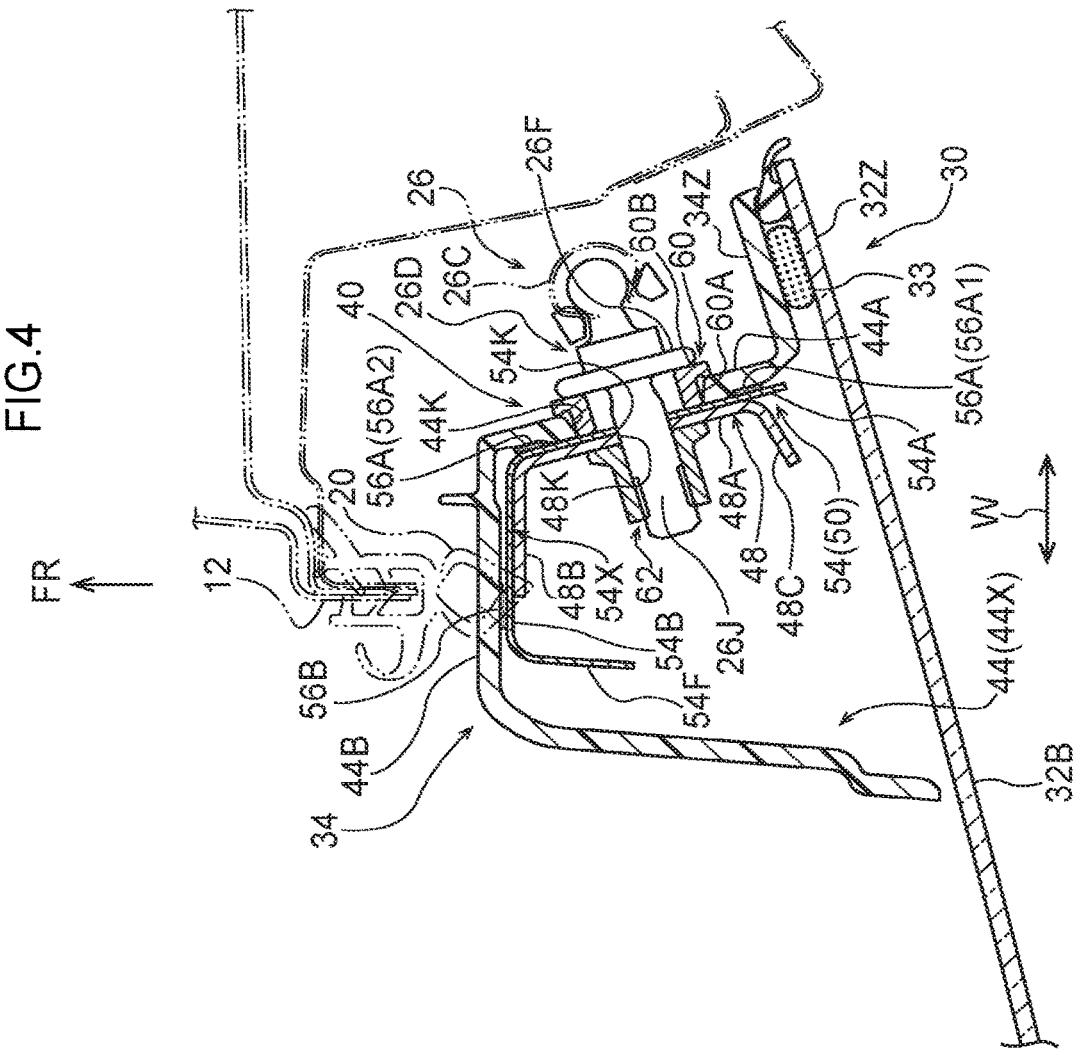
FIG. 4 is an enlarged cross-section illustrating a state sectioned along line 4-4 in FIG. 2.

Metal reinforcement brackets 48 are joined, by weld portions (not illustrated in the drawings), at a vehicle width direction outside location of the door vertical direction intermediate portions of the side reinforcement portions 54 of the hinge reinforcements 50 (see FIG. 4). Each reinforcement bracket 48 is disposed at the vehicle cabin outside of the hinge reinforcement 50 and extends in the door vertical direction.

Figure 3:
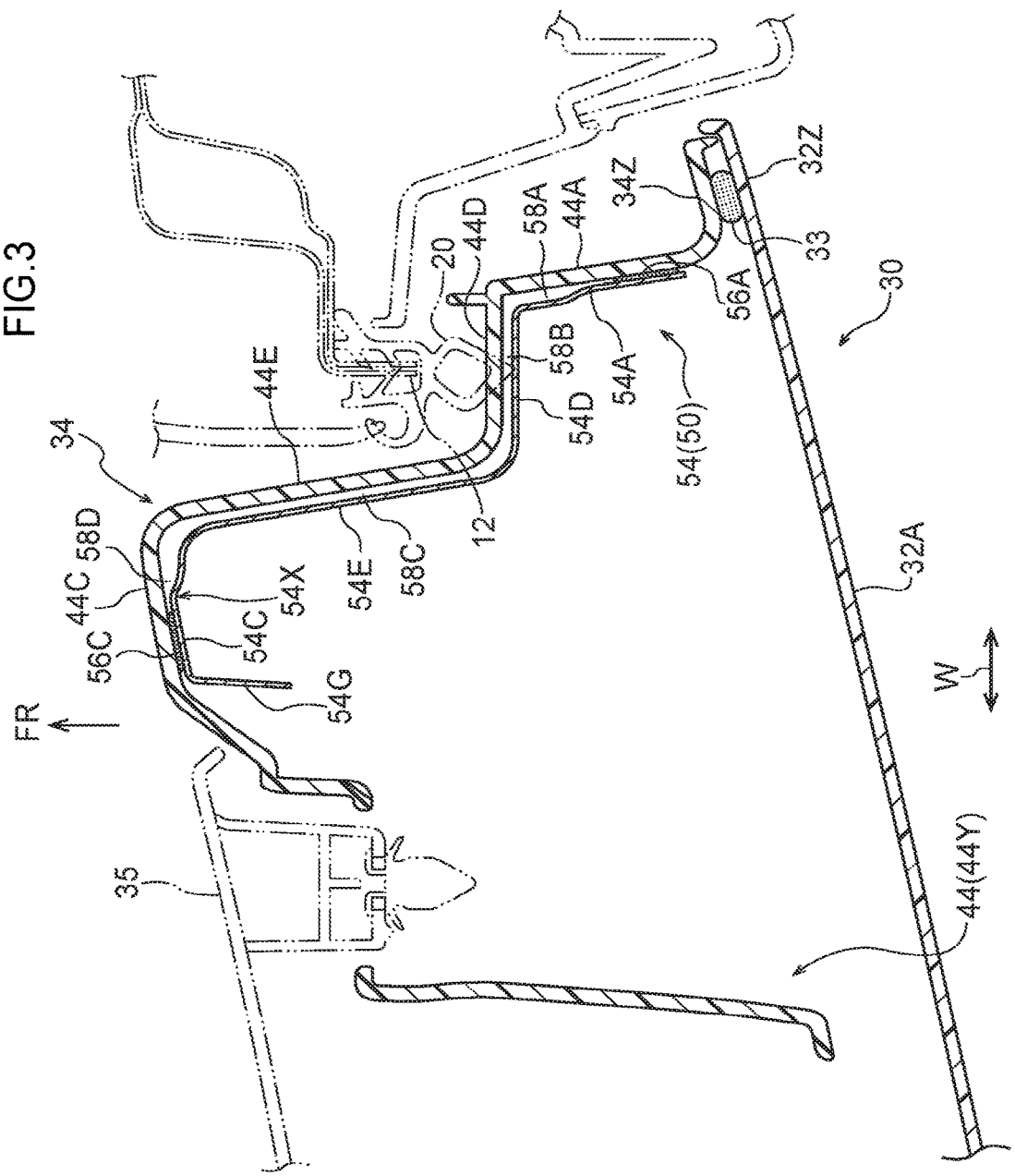
FIG. 3 is an enlarged cross-section illustrating a state sectioned along line 3-3 in FIG. 2.

Detailed explanation follows regarding the upright bead sections 44 of the door inner panel 34 and the side reinforcement portions 54 of the hinge reinforcements 50. FIG. 3 is an enlarged cross-section illustrating a state sectioned along line 3-3 in FIG. 2, and FIG. 4 is an enlarged cross-section illustrating a state sectioned along line 4-4 in FIG. 2.

As illustrated in FIG. 3 and FIG. 4, each upright bead section 44 includes an outside sidewall portion 44A that configures a vehicle width direction outside end portion of the upright bead section 44 and that is disposed running along the door thickness direction. Each upright bead section 44 also includes recessed bottom wall portions 44B, 44C that configure vehicle cabin inside end portions of the upright bead section 44 and that are disposed running along the vehicle width direction. Regarding the recessed bottom wall portions 44B, 44C, the numeral 44B is allocated to a recessed bottom wall portion of an upper configuration portion 44X formed in the upright bead sections 44 illustrated in FIG. 2 at an upper portion side of the door inner panel 34, and the numeral 44C is appended to a recessed bottom wall portion of a lower configuration portions 44Y formed to the upright bead sections 44 at a lower portion side of the door inner panel 34. As illustrated in FIG. 3 and FIG. 4, a vehicle cabin outside terminal end of the outside sidewall portion 44A is connected to a vehicle width direction inside terminal end of the outer peripheral edge portion 34Z of the door inner panel 34. As illustrated in FIG. 4, in the upper configuration portion 44X of the upright bead section 44, a vehicle cabin inside terminal end of the outside sidewall portion 44A is connected to a vehicle width direction outside terminal end of the recessed bottom wall portion 44B.

Moreover, as illustrated in FIG. 3, in the lower configuration portion 44Y of the upright bead section 44, a vehicle cabin inside terminal end of the outside sidewall portion 44A and a vehicle width direction outside terminal end of the recessed bottom wall portion 44C are connected together through a first intermediate wall portion 44D and a second intermediate wall portion 44E.

The first intermediate wall portion 44D extends from the vehicle cabin inside terminal end of the outside sidewall portion 44A toward the vehicle width direction inside. The second intermediate wall portion 44E links a vehicle width direction inside terminal end of the first intermediate wall portion 44D together with a vehicle width direction outside terminal end of the recessed bottom wall portion 44C, and is disposed running along the door thickness direction. In the closed state of the door, the first intermediate wall portion 44D abuts the weather strip 20 that is installed to the back door opening 12. Note that, as illustrated in FIG. 4, in the upper configuration portion 44X of the upright bead section 44, it is the recessed bottom wall portion 44B that abuts the weather strip 20 installed to the back door opening 12 in the door closed state. To explain further, as illustrated in FIG. 2, the first intermediate wall portion 44D of the lower configuration portion 44Y and the recessed bottom wall portion 44B of the upper configuration portion 44X are formed so as to be continuous to each other.

As illustrated in FIG. 2 to FIG. 4, each side reinforcement portion 54 of the hinge reinforcements 50 is disposed inside the recessed shape of the upright bead section 44 and extends in the door vertical direction. As illustrated in FIG. 3 and FIG. 4, the side reinforcement portion 54 includes a bent plate portion 54X having a bent plate shape running along locations of the upright bead section 44 from the outside sidewall portion 44A to the recessed bottom wall portions 44B, 44C.

The bent plate portion 54X of the side reinforcement portion 54 includes an outside sidewall reinforcement portion 54A disposed along the outside sidewall portion 44A, and recessed bottom wall reinforcement portions 54B, 54C respectively disposed along the recessed bottom wall portions 44B, 44C. The bent plate portion 54X of the side reinforcement portion 54 also includes a first intermediate wall reinforcement portion 54D disposed along the first intermediate wall portion 44D illustrated in FIG. 3, and a second intermediate wall reinforcement portion 54E disposed along the second intermediate wall portion 44E. As illustrated in FIG. 3 and FIG. 4, the outside sidewall reinforcement portion MA of the side reinforcement portion 54 (bent plate portion 54X) is joined to the outside sidewall portion 44A through an adhesive layer 56A, and the recessed bottom wall reinforcement portions 54B, 54C of the side reinforcement portion 54 (bent plate portion 54X) are joined to the recessed bottom wall portions 44B, 44C through respective adhesive layers 56B, 56C.

Note that, as illustrated in FIG. 2, an extension portion (the adhesive layer 56X) on the door vertical direction lower side of the adhesive layer 56B is interposed between a door vertical direction upper portion of the first intermediate wall reinforcement portion 54D and a door vertical direction upper portion of the first intermediate wall portion 44D. A door vertical direction lower end of the extension portion is set so as to be at the door vertical direction position corresponding to that of a door vertical direction upper end of the adhesive layer 56C. Moreover, a door vertical direction lower end position of the reinforcement bracket 48 is set so as to be at a door vertical direction position further to the lower side than the door vertical direction lower end position of the adhesive layer 56X.

Here, further explanation is given regarding the location where the side reinforcement portion 54 is disposed inside the recessed shape of the lower configuration portion 44Y of the upright bead section 44, with reference to FIG. 3.

As illustrated in FIG. 3, in the outside sidewall reinforcement portion 54A of the side reinforcement portion 54 (bent plate portion 54X), a door thickness direction intermediate portion configures a step portion, and a vehicle cabin outside location of the outside sidewall reinforcement portion 54A is disposed slightly further to the vehicle width direction outside than a vehicle cabin inside location of the outside sidewall reinforcement portion 54A. The vehicle cabin outside location of the outside sidewall reinforcement portion 54A is joined to the vehicle cabin outside location of the outside sidewall portion 44A through the adhesive layer 56A. Moreover, in the recessed bottom wall reinforcement portion 54C of the side reinforcement portion 54 (bent plate portion 54X), a vehicle width direction intermediate portion configures a step portion, and a vehicle width direction inside location of the recessed bottom wall reinforcement portion 54C is disposed slightly further to the vehicle cabin inside than a vehicle width direction outside location of the recessed bottom wall reinforcement portion 54C. The vehicle width direction inside location of the recessed bottom wall reinforcement portion 54C is joined to the vehicle width direction inside location of the recessed bottom wall portion 44C through the adhesive layer 56C.

Moreover, the side reinforcement portion 54 (bent plate portion 54X) is set with a first gap 58A between the vehicle cabin inside location of the outside sidewall portion 44A and the side reinforcement portion 54, a second gap 58B between the first intermediate wall portion 44D and the side reinforcement portion 54, a third gap 58C between the second intermediate wall portion 44E and the side reinforcement portion 54, and a fourth gap 58D between the vehicle width direction outside of the recessed bottom wall portion 44C and the side reinforcement portion 54, respectively. The first gap 58A and the second gap 58B are set so as to be continuous to each other, the second gap 58B and the third gap 58C are set so as to be continuous to each other, and the third gap 58C and the fourth gap 58D are set so as to be continuous to each other.

Note that a flange 54G is formed extending from a vehicle width direction inside terminal end of the recessed bottom wall reinforcement portion 54C toward the vehicle cabin outside. Similarly, a flange 54F is also formed extending from a vehicle width direction inside terminal end of the recessed bottom wall portions 54B illustrated in FIG. 4 toward the vehicle cabin outside. The flanges 54F, 54G illustrated in FIG. 3 and FIG. 4 are for securing the rigidity of the side reinforcement portion 54.

Next, explanation follows regarding an attachment portion 40 of the damper 26 and a peripheral portion thereof, with reference to FIG. 4.

As illustrated in FIG. 4, the attachment portion 40 of the damper 26 installed to the outside sidewall portion 44A of the upright bead section 44, the outside sidewall reinforcement portion 54A of the side reinforcement portion 54, and the reinforcement bracket 48. Note that the reinforcement bracket 48 includes a first reinforcement portion 48A superimposed on the outside sidewall reinforcement portion 54A of the side reinforcement portion 54, a second reinforcement portion 48B superimposed on the recessed bottom wall portion 54B of the side reinforcement portion 54, and a reinforcement flange 48C extending from a vehicle cabin outside terminal end of the first reinforcement portion 48A toward the vehicle width direction inside.

A through hole 44K, for passing the stay attachment bolt 26D through, is formed in the outside sidewall portion 44A of the upright bead section 44, and a tube shaped shaft portion 60A of a flanged collar 60 is disposed inside the through hole 44K in an inserted state. The shaft portion 60A of the flanged collar 60 abuts an outer peripheral portion of a bolt insertion hole 54K formed in the outside sidewall reinforcement portion 54A of the side reinforcement portion 54. A flanged portion 60B of the flanged collar 60 contacts a vehicle width direction outside face of the outside sidewall portion 44A. A bolt insertion hole 48K is formed penetrating through the reinforcement bracket 48 at a position corresponding to the bolt insertion hole 54K of the outside sidewall reinforcement portion 54A. A weld nut 62 is pre-fixed to the outer periphery of the bolt insertion hole 48K on a vehicle width direction inside face of the reinforcement bracket 48.

A shaft portion 26J of the stay attachment bolt 26D penetrates inside the flanged collar 60 and through the bolt insertion holes 54K, 48K from the vehicle width direction outside, and is screwed into the weld nut 62. Thus, the flanged collar 60, the outside sidewall reinforcement portion 54A of the side reinforcement portion 54, and the first reinforcement portion 48A of the reinforcement bracket 48 are sandwiched between a flange 26F of the stay attachment bolt 26D and the weld nut 62, and fastened together. In other words, the stay attachment bolt 26D is attached to the outside sidewall portion 44A of the upright bead section 44, the outside sidewall reinforcement portion 54A of the side reinforcement portion 54, and the first reinforcement portion 48A of the reinforcement bracket 48.

In the outside sidewall reinforcement portion 54A of the side reinforcement portion 54, a location of the outside sidewall reinforcement portion 54A at the vehicle cabin outside of the attachment portion 40 of the damper 26 is joined to the outside sidewall portion 44A through the adhesive layer 56A (56A1) at the door vertical direction position corresponding to that of the attachment portion 40 of the damper 26 illustrated in FIG. 4, and a location of the outside sidewall reinforcement portion 54A at the vehicle cabin inside of the attachment portion 40 of the damper 26 is joined to the outside sidewall portion 44A through the adhesive layer 56A (56A2).

Operation of Present Exemplary Embodiment

Next, explanation follows regarding operation of the exemplary embodiment above.

As illustrated in FIG. 2, the rigidity of the two vehicle width direction end portions of the door inner panel 34 against biasing force of the dampers 26 in the door closed state (see FIG. 1) is increased by the upright bead sections 44, due to forming the upright bead sections 44 extending in the door vertical direction with recessed shapes indented toward the vehicle cabin inside at the two vehicle width direction end portions of the resin door inner panel 34. Moreover, the side reinforcement portions 54 of the metal hinge reinforcements 50 are disposed inside the recessed shapes of upright bead sections 44, and extend in the door vertical direction, such that the upright bead sections 44 are reinforced by the hinge reinforcements 50.

As illustrated in FIG. 3 and FIG. 4, the side reinforcement portion 54 of the hinge reinforcement 50 includes the bent plate portion 54X having a bent plate shape running along locations of the upright bead section 44 from the outside sidewall portion 44A to the recessed bottom wall portions 44B, 44C. The outside sidewall reinforcement portion 54A of the hinge reinforcement 50 is joined to the outside sidewall portion 44A through the adhesive layer 56A, and is joined to the recessed bottom wall portions 44B, 44C through the adhesive layers 56B, 56C. Accordingly, in this structure, in cases in which locations from the outside sidewall portion 44A to the recessed bottom wall portions 44B, 44C of the upright bead section 44 attempt to deform due to load input, deformation of the locations from the outside sidewall portion 44A to the recessed bottom wall portions 44B, 44C can be suppressed along the entirety of the bent plate portion 54X of the side reinforcement portion 54. Accordingly, in cases in which, in a door closed state, biasing force from the dampers 26 is borne by the door inner panel 34 (see FIG. 1), the rigidity of the side reinforcement portions 54 can be effectively utilized against the load. In this structure, the joining structure between the upright bead sections 44 and the side reinforcement portions 54 is not visible from the vehicle cabin, and an increase in mass can also be suppressed.

As illustrated in FIG. 3, in the lower configuration portion 44Y of the upright bead section 44, the first intermediate wall portion 44D extending from the vehicle cabin inside terminal end of the outside sidewall portion 44A toward the vehicle width direction inside abuts the weather strip 20 in the door closed state. In the lower configuration portion 44Y of the upright bead section 44, the second intermediate wall portion 44E that links the vehicle width direction inside terminal end of the first intermediate wall portion 44D together with the vehicle width direction outside terminal end of the recessed bottom wall portion 44C is disposed running along the door thickness direction, and the upright bead section 44 is shaped further indented to the cabin inside from the first intermediate wall portion 44D abutting the weather strip 20. By contrast, the side reinforcement portion 54 includes the bent plate portion 54X having a bent plate shape running along locations of the upright bead section 44 from the outside sidewall portion 44A to the recessed bottom wall portion 44C. The side reinforcement portion 54 is joined to the outside sidewall portion 44A through the adhesive layer 56A and is also joined to the recessed bottom wall portion 44C through the adhesive layer 56C. Accordingly, even if a depth of the upright bead section 44 in the door thickness direction is deep, deformation of the locations from the outside sidewall portion 44A to the recessed bottom wall portion 44C can be effectively suppressed by the side reinforcement portion 54.

Moreover, at the locations of the upright bead section 44 where the side reinforcement portion 54 is disposed inside the recessed shape of the lower configuration portion 44Y, the side reinforcement portion 54 is joined to the vehicle cabin outside location of the outside sidewall portion 44A through the adhesive layer 56A, and is joined to the vehicle width direction inside location of the recessed bottom wall portion 44C through the adhesive layer 56C. Moreover, the side reinforcement portion 54 is set with the gaps 58A to 58D between the vehicle cabin inside location of the outside sidewall portion 44A and the side reinforcement portion 54, between the first intermediate wall portion 44D and the side reinforcement portion 54, between the second intermediate wall portion 44E and the side reinforcement portion 54, and between the vehicle width direction outside location of the recessed bottom wall portion 44C and the side reinforcement portion 54, respectively. Thus, an increase in mass can be even further suppressed, and, even were errors to occur in manufacturing the upright bead section 44 and the side reinforcement portion 54, such manufacturing errors would be absorbed by the gaps 58A to 58D. Moreover, a non-contact state is achieved, in which non-joined portions between the lower configuration portion 44Y of the upright bead section 44 and the side reinforcement portion 54 do not make contact with each other, thereby enabling abnormal noise originating from friction or the like between non-joined portions to be suppressed from arising.

Figure 5:
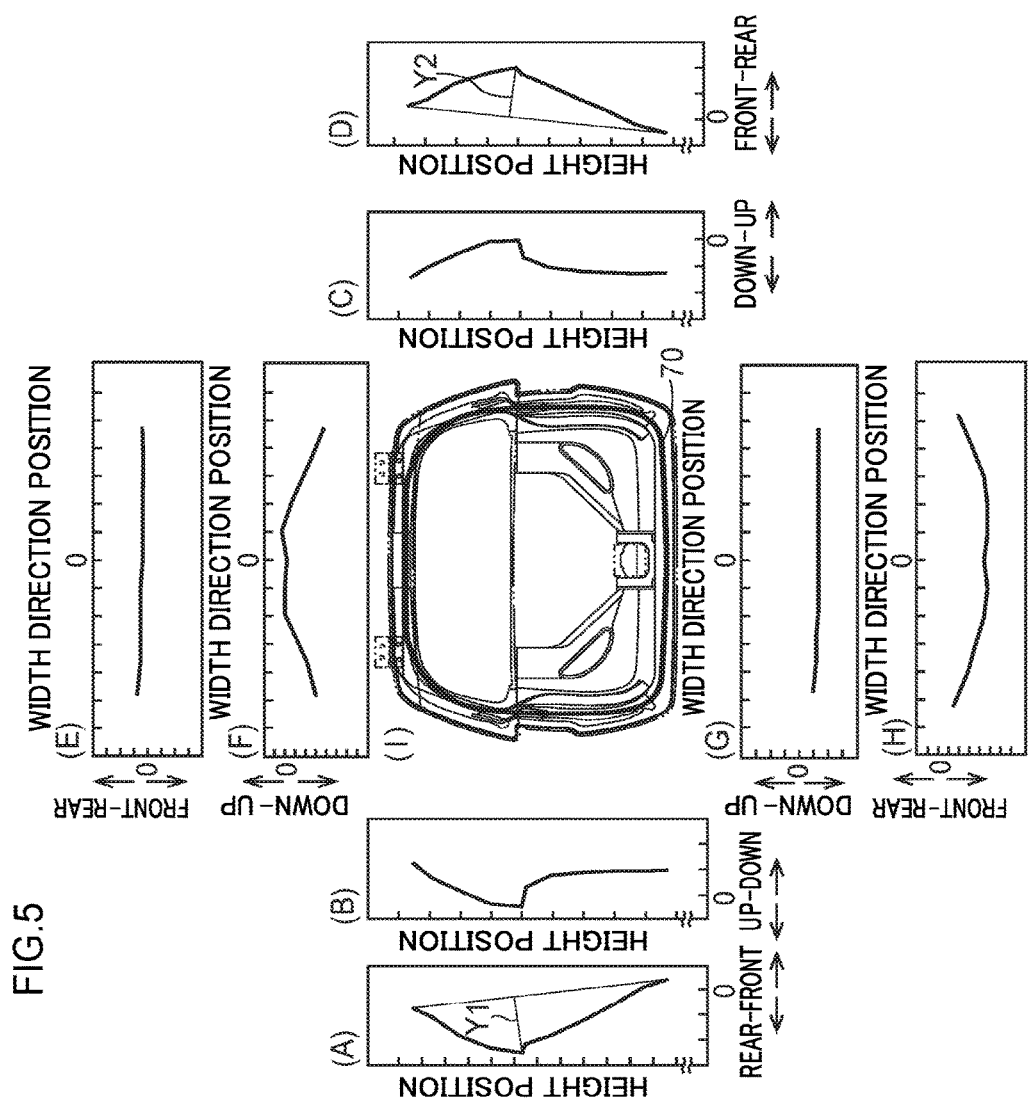
FIG. 5 is an explanatory diagram for explaining a fitted state of a back door applied with a comparative structure.
Figure 6:
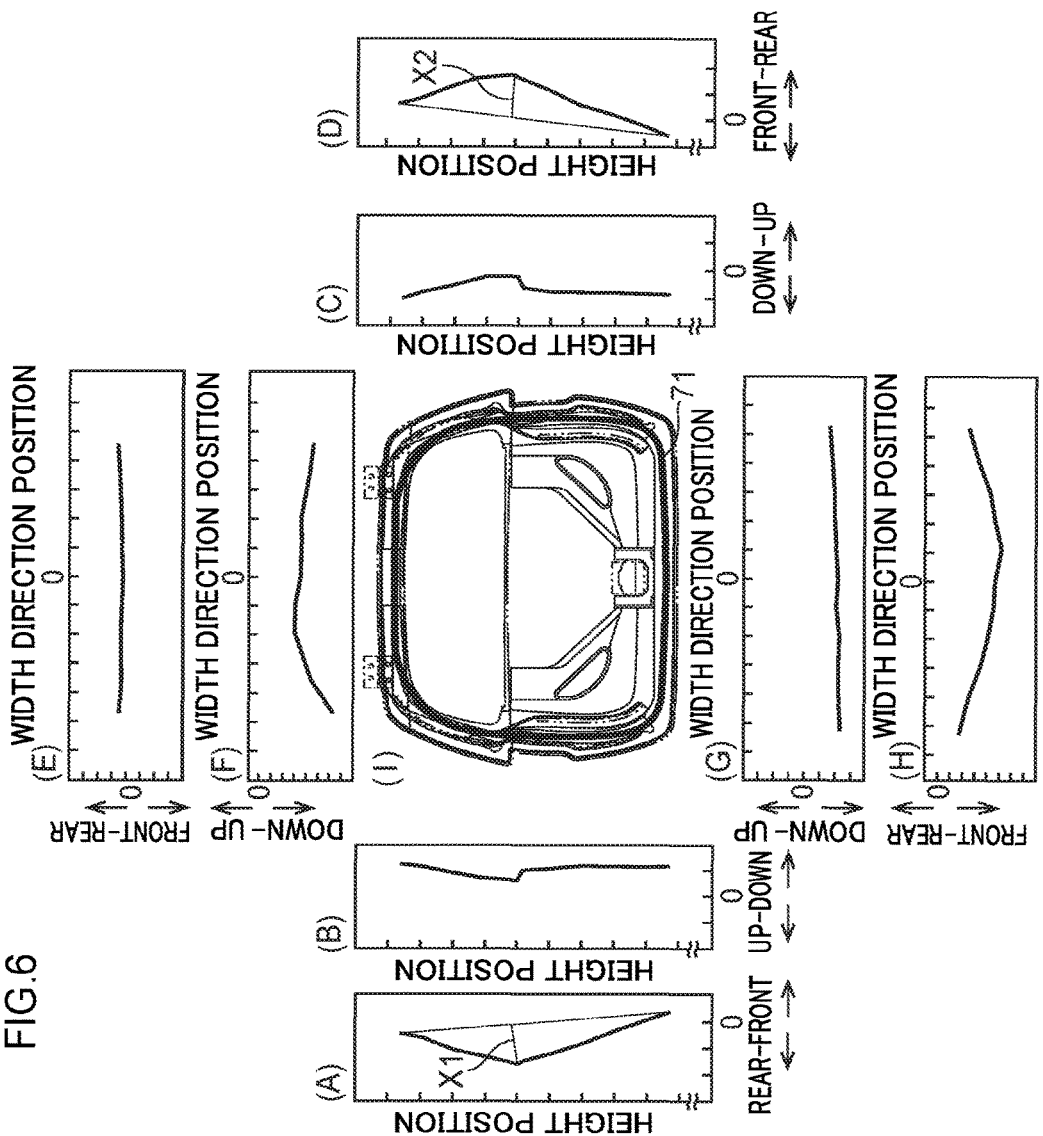
FIG. 6 is an explanatory diagram for explaining a fitted state of a back door applied with a structure in which an upright bead section and a side reinforcement portion are joined together through an adhesive layer.

Supplementary explanation follows, with reference to the graphs in FIG. 5 and FIG. 6. Each graph illustrated in FIG. 5 and FIG. 6 illustrates an amount of positional displacement for a closed back door 30 installed with dampers 26 and a weather strip 20 and locked by a door lock mechanism 24, with respect to a reference position of a closed back door 30 not installed with the dampers 26 and the weather strip 20 and not locked by a door lock mechanism 24.

The graphs in FIG. 6 illustrate the results of a back door applied with a structure in which upright bead sections and side reinforcement portions are joined together through adhesive layers. To explain more specifically, this structure is similar to the back door structure according to the present exemplary embodiment, except for the point in that there is no adhesive layer 56A (56A2) present at the outside sidewall reinforcement portion 54A illustrated in FIG. 4 between the locations at the vehicle cabin inside of the attachment portion 40 of the damper 26, and the outside sidewall portion 44A. By way of contrast, the graphs in FIG. 5 illustrate the results of a resin back door applied with a comparative structure. The comparative structure is a structure in which the adhesive layers 56A, 56B, 56C of the present exemplary embodiment are not provided between the upright bead sections 44 and the side reinforcement portions 54, and is a structure in which the upright bead sections and the side reinforcement portions are fastened together using bolts. To explain more specifically, in the comparative structure, there are a total of three locations where the lower configuration portion of each of the side reinforcement portions is fastened by bolts to the outside sidewall portion, a total of two locations where the lower configuration portion is fastened by bolts to the recessed bottom wall portions, and a total of two locations where the upper configuration portion of each of the side reinforcement portions is fastened by bolts to the outside sidewall portion. Note that the comparative structure is similar to the back door structure of the present exemplary embodiment in other respects.

In FIG. 5 (I) and FIG. 6 (I) illustrate a state similar to that in FIG. 2 of a back door subject to measurement. A bold line 70 in FIG. 5 (I) and a bold line 71 in FIG. 6 (I) respectively illustrate measurement locations. Moreover, FIG. 5 (A), FIG. 5 (B), FIG. 6 (A), and FIG. 6 (B) are graphs illustrating the results at a door left edge portion, and FIG. 5 (C), FIG. 5 (D), FIG. 6 (C), and FIG. 6 (D) are graphs illustrating the results at a door right edge portion. Moreover, FIG. 5 (E), FIG. 5 (F), FIG. 6 (E), and FIG. 6 (F) are graphs illustrating the results at a door upper edge portion, and FIG. 5 (G), FIG.

5 (H), FIG. 6 (G), and FIG. 6 (H) are graphs illustrating the results at a door lower edge portion.

The vertical axes in FIG. 5 (A) to FIG. 5 (D) and FIG. 6 (A) to FIG. 6 (D) respectively indicate the height position in the vehicle vertical direction. The horizontal axes in FIG. 5 (A), FIG. 5 (D), FIG. 6 (A), and FIG. 6 (D) respectively indicate the amount of displacement (offset amount) in the vehicle front-rear direction, and the horizontal axes in FIG. 5 (B), FIG. 5 (C), FIG. 6 (B), and FIG. 6 (C) respectively indicate the amount of displacement (offset amount) in the vehicle vertical direction.

The horizontal axes in FIG. 5 (E) to FIG. 5 (H) and FIG. 6 (E) to FIG. 6 (H) respectively indicate the position in the vehicle width direction. The vertical axes in FIG. 5 (E), FIG. 5 (H), FIG. 6 (E), and FIG. 6 (H) respectively indicate the amount of displacement (offset amount) in the vehicle front-rear direction, and the vertical axes in FIG. 5 (F), FIG. 5 (G), FIG. 6 (F), and FIG. 6 (G) respectively indicate the amount of displacement (offset amount) in the vehicle vertical direction.

As illustrated in the graphs, it is apparent that, on the whole, the structure in which the upright bead sections and the side reinforcement portions are joined together through adhesive layers (FIG. 6) is better than the comparative structure in which the upright bead sections and the side reinforcement portions are fastened together by bolts (FIG. 5). As illustrated in FIG. 5 (A), FIG. 5 (D), FIG. 6 (A), and FIG. 6 (D), curve change amounts X1, X2 (FIG. 6 (A) and FIG. 6 (D)) of a back door applied with a structure in which the upright bead sections and the side reinforcement portions are joined together through adhesive layers are significantly suppressed compared to curve change amounts Y1, Y2 (FIG. 5 (A) and FIG. 5 (D)) of a back door of the comparative structure in which the upright bead sections and the side reinforcement portions are fastened together by bolts. Note that each of the curve change amounts refers to a maximum distance from a straight line connecting the two ends of the graph line together, to an intersection point of the respective graph line with the perpendicular line.

As illustrated in FIG. 4, in the present exemplary embodiment, the attachment portion 40 of the damper 26 installed to the outside sidewall portion 44A of the upright bead section 44 and in the outside sidewall reinforcement portion 54A of the side reinforcement portion 54, such that load from the damper 26 side directly acts on the outside sidewall portion 44A of the upright bead section 44 and on the outside sidewall reinforcement portion 54A of the side reinforcement portion 54. At the door vertical direction position corresponding to that of the attachment portion 40 of the damper 26, a location of the outside sidewall reinforcement portion 54A at the vehicle cabin outside of the attachment portion 40 of the damper 26 is joined to the outside sidewall portion 44A through the adhesive layer 56A (56A1), and a location of the outside sidewall reinforcement portion 54A at the vehicle cabin inside of the attachment portion 40 of the damper 26 is joined to the outside sidewall portion 44A through the adhesive layer 56A (56A2). Thus, even if force from the damper 26 side acts directly on the outside sidewall portion 44A of the upright bead section 44 and the outside sidewall reinforcement portion 54A of the side reinforcement portion 54 substantially along the door thickness direction, relative displacement between the outside sidewall portion 44A of the upright bead section 44 and the outside sidewall reinforcement portion 54A of the side reinforcement portion 54 can be effectively suppressed by the adhesive layers 56A (56A1, 56A2).

As explained above, in the vehicle back door structure of the present exemplary embodiment, a rigid fit of the back door 30 can be secured, while suppressing an increase in mass. In the present exemplary embodiment, cost can also be suppressed compared to a comparative structure in which, for example, the upright bead sections and the side reinforcement portions are fastened together by bolts.

Supplementary Explanation of Exemplary Embodiment

Note that as a modified example of the exemplary embodiment above, locations of the side reinforcement portions disposed inside the recessed shapes of the lower configuration portions of the upright bead sections, may be joined to the outside sidewall portions and to the recessed bottom wall portions through adhesive layers, and may be joined to at least one out of the first intermediate wall portion or the second intermediate wall portion through an adhesive layer.

Although, at the door vertical direction position corresponding to that of the attachment portions of the dampers, locations of the outside sidewall reinforcement portions at the vehicle cabin outside of the attachment portions of the dampers are joined to the outside sidewall portions of the upright bead sections through adhesive layers, as a modified example of the exemplary embodiment above, a structure may be adopted in which an adhesive layer is not interposed between the locations of the outside sidewall reinforcement portions at the vehicle cabin inside of the attachment portions of the dampers, and the outside sidewall portions of the upright bead sections.

In the exemplary embodiment above, the hinge reinforcements 50 are made of metal; however, hinge reinforcements made of fiber reinforced resin (FRP (as an example, CFRP)) may be employed as the reinforcements.

In the exemplary embodiment above, the door outer panel 32A of the outer unit 32 is made of resin; however, a configuration may be adopted in which the door outer panel of the outer unit is made of metal.

Note that "vehicle cabin inside" in the first to third aspects according to technology disclosed herein, and "vehicle cabin outside" in the second and third aspect according to technology disclosed herein, are directions in the closed state of the back door as in the exemplary embodiment above.

Note that as a reference example that is not the exemplary embodiment of the present disclosure, a structure substantially similar to the exemplary embodiment above may also be used in a vehicle hood.

Note that combinations of the present exemplary embodiment and the plural modified examples described above may be implemented as appropriate.

An example of the present disclosure has been described above; however, the present disclosure is not limited to the above, and obviously various modifications other than the above may be implemented within a range not departing from the spirit of the present disclosure.

What is claimed is:
1. A vehicle back door structure comprising:
a back door that opens and closes a back door opening at a vehicle rear section, the back door having an upper end portion attached to a vehicle body upper section by a door hinge, a vehicle width direction intermediate portion of a lower end portion latched to a vehicle body lower section by a door lock mechanism, and two vehicle width direction end portions of a vertical direction intermediate portion, the two vehicle width direction end portions being biased toward a vehicle cabin outside by dampers in a closed state;

a resin door inner panel that configures a door inner panel of the back door, the door inner panel formed with a pair of left and right upright bead sections having recessed shapes indented toward a vehicle cabin inside and extending along a door vertical direction at two respective vehicle width direction end portions of the door inner panel, with each of the upright bead sections configured including an outside sidewall portion that configures a vehicle width direction outside end portion of the upright bead section, the outside sidewall portion disposed running along a door thickness direction, and a recessed bottom wall portion that configures a vehicle cabin inside end portion of the upright bead section, the recessed bottom wall portion disposed running along a vehicle width direction; and a pair of left and right reinforcements that are each configured including a side reinforcement portion disposed inside the recessed shape of the respective upright bead section, the side reinforcement portion extending in the door vertical direction, with each of the side reinforcement portions including a bent plate portion having a bent plate shape running along locations of the respective upright bead section from the outside sidewall portion to the recessed bottom wall portion, and each of the side reinforcement portions being joined to the outside sidewall portion and to the recessed bottom wall portion through respective adhesive layers, wherein lower configuration portions having the recessed shapes are formed to the upright bead sections at a lower portion side of the door inner panel are each configured including a first intermediate wall portion that extends from a vehicle cabin inside terminal end of the outside sidewall portion toward a vehicle width direction inside, the first intermediate wall portion abutting a weather strip installed to the back door opening in a door closed state, and a second intermediate wall portion that links a vehicle width direction inside terminal end of the first intermediate wall portion together with a vehicle width direction outside terminal end of the recessed bottom wall portion, the second intermediate wall portion disposed running along the door thickness direction.

2. The vehicle back door structure of claim 1, wherein:
at locations disposed inside the recessed shapes of the lower configuration portions, the side reinforcement portions are joined through respective adhesive layers at a vehicle cabin outside location of the outside sidewall portion and at a vehicle width direction inside location of the recessed bottom wall portion, and the side reinforcement portions are set with a gap to a vehicle cabin inside location of the outside sidewall portion, a gap to the first intermediate wall portion, a gap to the second intermediate wall portion, and a gap to a vehicle width direction outside location of the recessed bottom wall portion.

3. The vehicle back door structure of claim 2, wherein:
attachment portions of the dampers are installed to the outside sidewall portions of the upright bead sections, and to outside sidewall reinforcement portions disposed running along the outside sidewall portions at the bent plate portions of the side reinforcement portions; and, at door vertical direction positions corresponding to the attachment portions of the dampers, the outside sidewall reinforcement portions are joined to the outside sidewall portions through respective adhesive layers at respective locations to the vehicle cabin outside and to the vehicle cabin inside of the damper attachment portions.

4. The vehicle back door structure of claim 1, wherein:
attachment portions of the dampers are installed to the outside sidewall portions of the upright bead sections, and to outside sidewall reinforcement portions disposed running along the outside sidewall portions at the bent plate portions of the side reinforcement portions; and, at door vertical direction positions corresponding to the attachment portions of the dampers, the outside sidewall reinforcement portions are joined to the outside sidewall portions through respective adhesive layers at respective locations to the vehicle cabin outside and to the vehicle cabin inside of the damper attachment portions.

* * * * *